(12) United States Patent
Yang et al.

(10) Patent No.: US 10,417,800 B2
(45) Date of Patent: Sep. 17, 2019

(54) TECHNIQUES FOR MERGING VIRTUAL AND PHYSICAL FLOOR MAPS

(71) Applicant: INTEL CORPORATION, Santa Clara, CA (US)

(72) Inventors: Lei Yang, Hillsboro, OR (US); Xue Yang, Arcadia, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/089,488

(22) Filed: Apr. 2, 2016

(65) Prior Publication Data

US 2016/0307348 A1    Oct. 20, 2016

Related U.S. Application Data

(63) Continuation of application No. 13/976,446, filed as application No. PCT/US2013/041793 on May 20, 2013, now abandoned.

(51) Int. Cl.

| | |
|---|---|
| *G01C 21/20* | (2006.01) |
| *G06T 11/60* | (2006.01) |
| *H04W 4/04* | (2009.01) |
| *G01S 19/10* | (2010.01) |
| *G01S 19/25* | (2010.01) |

(52) U.S. Cl.
CPC ............ *G06T 11/60* (2013.01); *G01C 21/206* (2013.01); *G01S 19/10* (2013.01); *G01S 19/25* (2013.01); *H04W 4/043* (2013.01)

(58) Field of Classification Search
None
See application file for complete search history.

(56) References Cited

U.S. PATENT DOCUMENTS

| | | | |
|---|---|---|---|
| 2008/0077326 A1* | 3/2008 | Funk | G01C 21/165 701/500 |
| 2012/0143495 A1 | 6/2012 | Dantu | |
| 2015/0365806 A1* | 12/2015 | Parviainen et al. | G06F 3/0346 455/457 |

FOREIGN PATENT DOCUMENTS

| | | |
|---|---|---|
| CN | 102209386 A | 10/2011 |
| CN | 102736060 A | 10/2012 |
| CN | 103003667 A | 3/2013 |

OTHER PUBLICATIONS

Link et al. "FootPath: Accurate Map-based Indoor Navigation Using Smartphones", Indoor Positioning and Indoor Navigation (IPIN), 2011 International Conference on Date Sep. 21-23, 2011.*

* cited by examiner

*Primary Examiner* — Yingchun He

(57) ABSTRACT

Various embodiments are generally directed to techniques to merge a virtual map derived from sensors of computing devices moved about an interior of a structure with a corresponding physical map. An apparatus to merge maps includes a processor component; and a merged map generator for execution by the processor component to merge a virtual map and a physical map to generate a merged map, the virtual map comprising indications of virtual pathways through an interior of a structure based on sensors, and the physical map comprising indications of physical pathways of the interior. Other embodiments are described and claimed.

22 Claims, 11 Drawing Sheets

TECHNIQUES FOR MERGING VIRTUAL AND PHYSICAL FLOOR MAPS

CROSS-REFERENCE TO RELATED APPLICATIONS

This application is a continuation under the provisions of 35 U.S.C. § 120 of U.S. patent application Ser. No. 13/976,446, entitled "TECHNIQUES FOR MERGING VIRTUAL AND PHYSICAL FLOOR MAPS", filed Jun. 26, 2013, which is a U.S. national phase under the provisions of 35 U.S.C. § 371 of International Patent Application No. PCT/US2013/041793, entitled "TECHNIQUES FOR MERGING VIRTUAL AND PHYSICAL FLOOR MAPS", filed May 20, 2013. The subject matter of U.S. patent application Ser. No. 13/976,446 and International Patent Application No. PCT/US2013/041793 are hereby incorporated herein by reference in their respective entireties.

TECHNICAL FIELD

Embodiments described herein generally relate to merging a virtual map of a floor of an interior of a structure with its physical map to enable location tracking therein.

BACKGROUND

Computing devices have long provided the ability to track a location relative to the surface of the Earth through receiving wireless signals from multiple global positioning system (GPS) satellites and deriving a current location from the indications of timing within those signals. Further, beyond simply indicating a current set of coordinates of that current location, computing devices have long provided the ability to correlate a current location to maps of the surface of the Earth to provide visual presentations of the current location on a map. Thus, users of such computing devices, whether handheld or installed within vehicles, have long been able to view a visual presentation of where they are on the surface of the Earth at any given moment.

Still further, many of such maps have long included information regarding items of interest in the vicinity of a current location, including businesses, public services, addresses, etc. Thus, users of such computing devices that receive GPS signals have long been able to view indications of where to go in their current vicinity to obtain a product or service, find an address, etc.

Unfortunately, the availability of such functions provided by computing devices typically ceases once the users of those devices go indoors and/or under a structure or other formation that blocks access to GPS signals. Depending on the thickness and/or material makeup of portions of such structures, access to GPS signals may become intermittent or distorted, or may be entirely cut off. As a result, users of such computing devices are often forced to resort to the use of more traditional maps mounted on walls or in posters to discern their current location once indoors.

DETAILED DESCRIPTION

Figure 1:
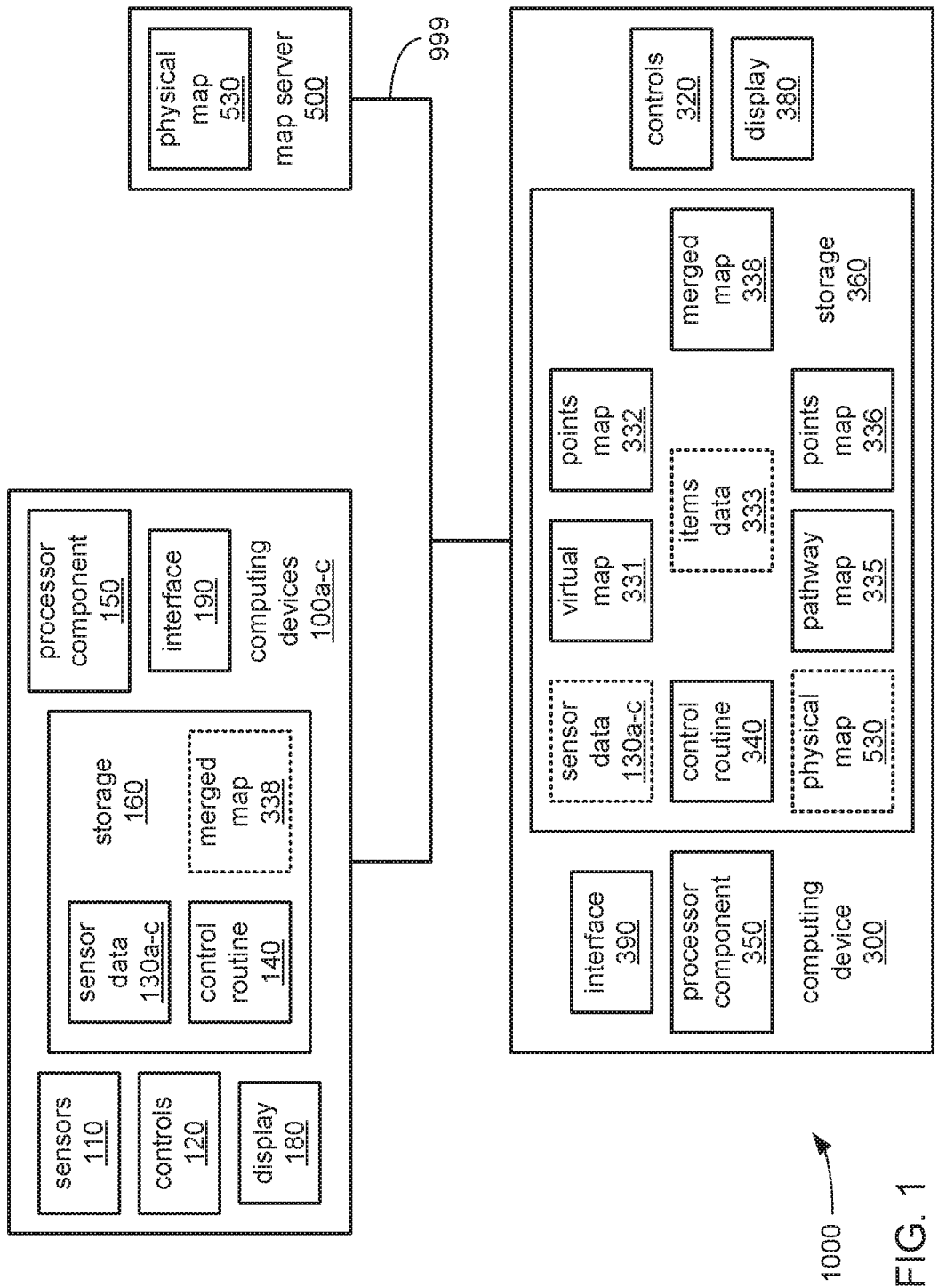
FIG. 1 illustrates an embodiment of a map merging system.

Various embodiments are generally directed to techniques to merge a virtual map derived from sensors of computing devices moved about an interior of a structure with a corresponding physical map. More specifically, a virtual map is derived over time from measurements taken by sensors of computing devices as those computing devices are moved about the interior (e.g., at least a portion of a floor of the structure). A physical map is then processed to extract physical pathway data from other data contained therein, generating a pathway map. The virtual map is then manipulated in a multiple-stage procedure to align it with the pathway map. The alignment of the virtual map to the pathway map is then correlated to the physical map, enabling merging of the virtual map and the physical map to form a merged map. Following such merging, other information concerning items of interest indicated in the virtual map may be incorporated into the merged map.

Depending on what features exist within the interior and what sensors are incorporated into those computing devices, formation of the virtual map may be based on movement correlated to compass headings and/or sensed accelerations, proximity of walls and/or other features detected acoustically, and/or relative strengths and/or positions of emitters of radio signals. It is envisioned that the formation of the virtual map may rely on combining portions of sensor data from numerous computing devices that have been transported through various portions of the interior over time in a manner describable as a form of "crowd-sourcing" of such sensor data. Such use of sensor data from multiple devices is envisioned as compensating for limitations in accuracy of the sensors incorporated into typical computing devices that may be carried by their various users through portions of an interior. Statistical analysis methods may be employed in deriving the virtual map from the many pieces of sensor data to remove statistically anomalous pieces of sensor data.

It is envisioned that the physical map may be available from a server of whatever corporate, governmental or other entity occupies that interior. It is presumed likely that the physical map may include data concerning more than physical pathways enabling movement through the interior, such as locations of water fountains, fire extinguishers, defibrillators, public telephones, structural posts, etc. Thus, extraction of physical pathway data to derive a pathway map is performed to filter out such other pieces of information.

The aligning of the virtual map to the pathway map is performed in at least two stages including at least one coarse stage and at least one fine stage to reduce processing demands. In such stages, an algorithm to minimize a measure of error in alignment is employed to derive an alignment that is then employed in merging the physical map and the virtual map to generate the merged map. Following generation of the merged map, the merged map may be augmented with indications of selected items of interest indicated in the virtual map that may have been detected by the sensors of computing devices.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of an embodiment of a map merging system 1000 incorporating one or more of computing devices 100a-c, a computing device 300 and a map server 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, these computing devices 100a-c, 300 and 500 exchange signals conveying sensor data and/or map data concerning an interior of a structure through a network 999. However, one or more of these computing devices may exchange other data entirely unrelated to a structure's interior with each other and/or with still other computing devices (not shown) via the network 999. In various embodiments, the network may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

It should be noted that although a specific quantity of three of the computing devices 100a-c to collect sensory information of an interior of a structure is depicted, such a quantity of computing devices is but an example presented herein to enable understanding. As will be explained in greater detail, it is envisioned that larger quantities of computing devices would be relied upon to collect such data in order to improve accuracy.

In various embodiments, each of the computing devices 100a-c incorporates one or more of a processor component 150, a storage 160, controls 120, a display 180 and an interface 190 to couple each of the computing devices 100a-c to the network 999. The storage 160 stores one or more of a control routine 140, a corresponding one of sensor data 130a-c and a merged map 338. In various embodiments, the computing device 300 incorporates one or more of a processor component 350, a storage 360, controls 320, a display 380 and an interface 390 to couple the computing device 300 to the network 999. The storage 360 stores one or more of a control routine 340, one or more of the sensor data 130a-c, a virtual map 331, a points map 332, an items data 333, a pathway map 335, another points map 336, a merged map 338 and physical map 530.

In each of the computing devices 100a-c, the control routine 140 incorporates a sequence of instructions operative on the processor component 150 in its role as a main processor component to implement logic to perform various functions. In executing the control routine 140, the processor component 150 receives signals from one or more sensors 110 as the corresponding one of the computing devices 100a-c is moved through an interior of a structure and stores indications of the sensory information conveyed in those signals from the sensors 110 as a corresponding one of the sensor data 130a-c. Thus, each of the sensor data 130a-c represents what the sensors 110 of each of the computing devices 100a-c, respectively, detected as each was moved through at least a portion of that interior, thereby forming a virtual representation of at least one pathway through that interior. As will be explained in greater detail, the exact nature of the sensory information depends on the type and degree of accuracy of the one or more sensors 110. At various intervals and/or upon being signaled by the computing device 300, the processor component 150 of each of the computing devices 100a-c transmits its corresponding one of the sensor data 130a-c to the computing device 300 via the network 999.

The control routine 340 incorporates a sequence of instructions operative on the processor component 350 in its role as a main processor component of the computing device 300 to implement logic to perform various functions. In executing the control routine 340, the processor component 350 receives the sensor data 130a-c from the corresponding ones of the computing devices 100a-c and generates the virtual map 331 therefrom. As familiar to those skilled in the art, any of a variety of algorithms may be employed to so generate the virtual map 331 from the sensor data 130*a-c*, and the exact manner in which this is done is beyond the scope of this application.

In executing the control routine 340, the processor component 350 also receives the physical map 530 from the map server 500 and extracts physical pathway data therefrom to generate the pathway map 335. Again, it is envisioned that the physical map 530 is a map of the physical arrangement of at least a portion of a floor of the interior of the structure indicating the locations of physical pathways enabling movement therethrough, and possible items of interest therein. As familiar to those skilled in the art, there is no one type of data structure that has become prevalent or a "de facto" standard for the organization or storage of data representing a map, and no prevalent or de facto standard for the manner in which information concerning pathways and/or indications of items of interest are incorporated into that data. Therefore, it is envisioned that the control routine 340 incorporates one or more algorithms to extract at least data indicating physical pathways from the physical map 530 while accommodating any of a variety of types of data structures by which the data of the physical map 530 may be organized or stored. The extracted indications of physical pathways are stored as the pathway map 335.

In executing the control routine 340, the processor component 350 further manipulates the virtual map 331 in various ways relative to the pathway map 335 to align the virtual pathways of the virtual map 331 to the physical pathways of the pathway map 335. Again, this alignment is performed in multiple stages. At least one "coarser" stage is performed in which the virtual map is rotated and/or proportionally resized relative to the pathway map 335 in relatively larger (e.g., "coarser") increments of degrees of rotation and/or percentages of rescaling to begin to align the virtual map 331 with the pathway map 335. Then, at least one "finer" stage is performed in which the virtual map is rotated and/or proportionally rescaled relative to the pathway map 335 in relatively smaller (e.g., "finer") increments. Such an approach of at least one coarser stage followed by at least one finer stage enables alignment to be performed in less time in a manner that is less demanding on the processor component 350 than what may be termed a "naive" approach of trying only a full range of finer increments. In performing both the coarser and finer stages, a measure of a degree of error for each increment tried at each stage is employed to determine when the best alignment possible has been achieved at each stage.

In executing the control routine 340, the processor component 350 still further employs the alignment achieved between the virtual map 331 and the pathway map 335 to guide the merging of the virtual map 331 and the physical map 350 to generate the merged map 338. Stated differently, given that the pathway map 335 is derived from the virtual map 350, the achievement of an alignment between the virtual map 331 and the pathway map 335 can be correlated to aligning the virtual map 331 to the physical map 530. The resulting merged map 338 thus incorporates all of the detail of the physical map 530 able to be viewed by users of computing devices with the indications of virtual pathways of the virtual map 331 able to be employed by those computing devices to determine their current location relative to the positions of possible items of interest originally indicated in the physical map 530.

As has been discussed, it may be deemed desirable to augment the merged map 339 with indications of the locations of various items of interest detected by the sensors 110 of the computing devices 100*a-c*. Therefore, during the generation of the virtual map 331, data concerning locations of items of interest from one or more of the sensor data 110*a-c* may be collected and stored as the items data 333. Then, following generation of the merged map 338, indications of the items of interest of the items data 333 may then be added to the merged map 338. Following generation of the merged map 338, either with or without such augmentation with indications of locations of items of interest, the processor component 350 transmits the merged map 339 to one or more of the computing devices 100*a-c*.

Returning to the computing devices 100*a-c*, in executing the control routine 140, the processor component 150 of one or more of the computing devices 100*a-c* receives the merged map 338 and visually presents at least a portion of it on the display 180. The sensors 110 are employed to determine the current location of respective ones of the computing devices 100*a-c* on the merged map 338 by correlating current sensory information to the data of the merged map 338 associated with the virtual map 331 that was generated from such sensor data. Where the merged map 338 incorporates indications of items of interest, ones of those items that are at least in the vicinity of the current location may also be visually presented on the display 180.

The processor element 150 may further monitor the controls 120 to receive signals indicative of manual operation of the controls 120 by a user of one or more of the computing devices 100*a-c* providing information concerning items of interest. This may occur during either or both of collecting sensory information from which the virtual map 331 (and ultimately the merged map 338) is generated, and collecting sensory information to determine a current location on the merged map 338. Thus, such information may be incorporated into one or more of the sensor data 130*a-c* provided to the computing device 300 or incorporated into the merged map 338, which may then be relayed back to the computing device 300 to augment the copy of the merged map 338 stored in the storage 360.

In various embodiments, each of the processor components 150 and 350 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160 and 360 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190 and 390 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
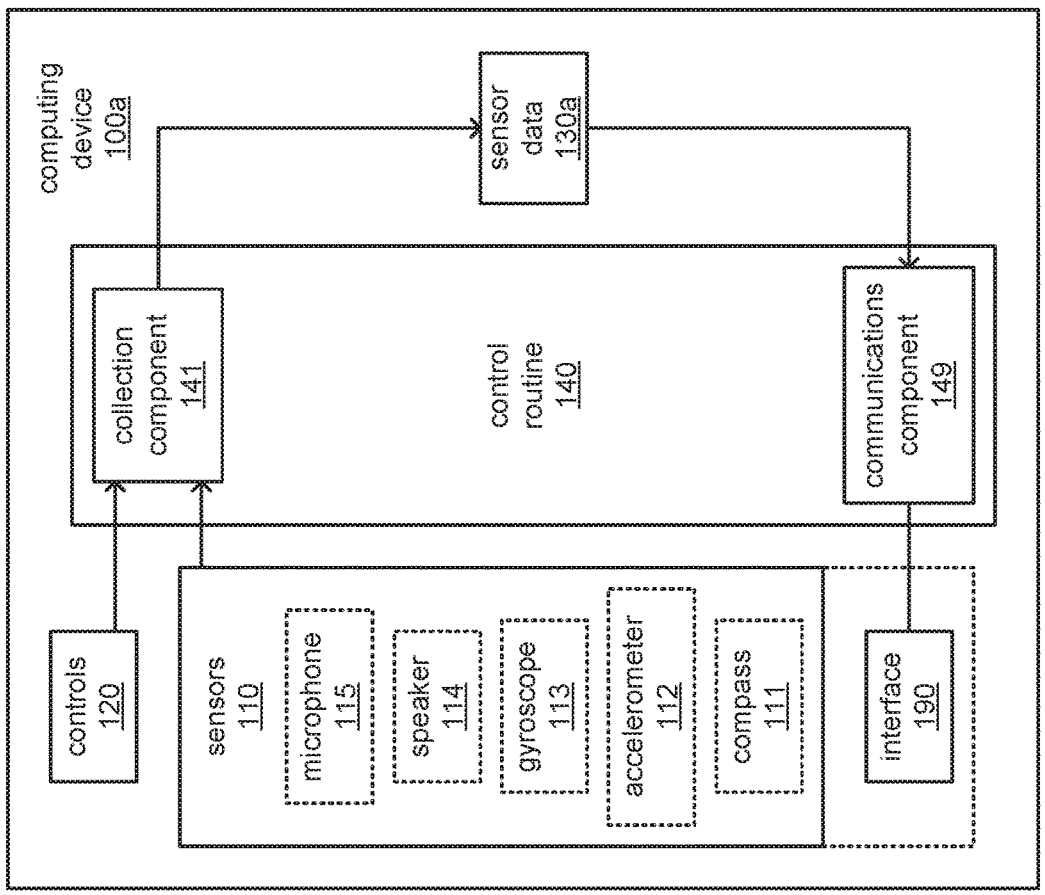
FIGS. 2-4 each illustrate a portion of an embodiment.
Figure 3:
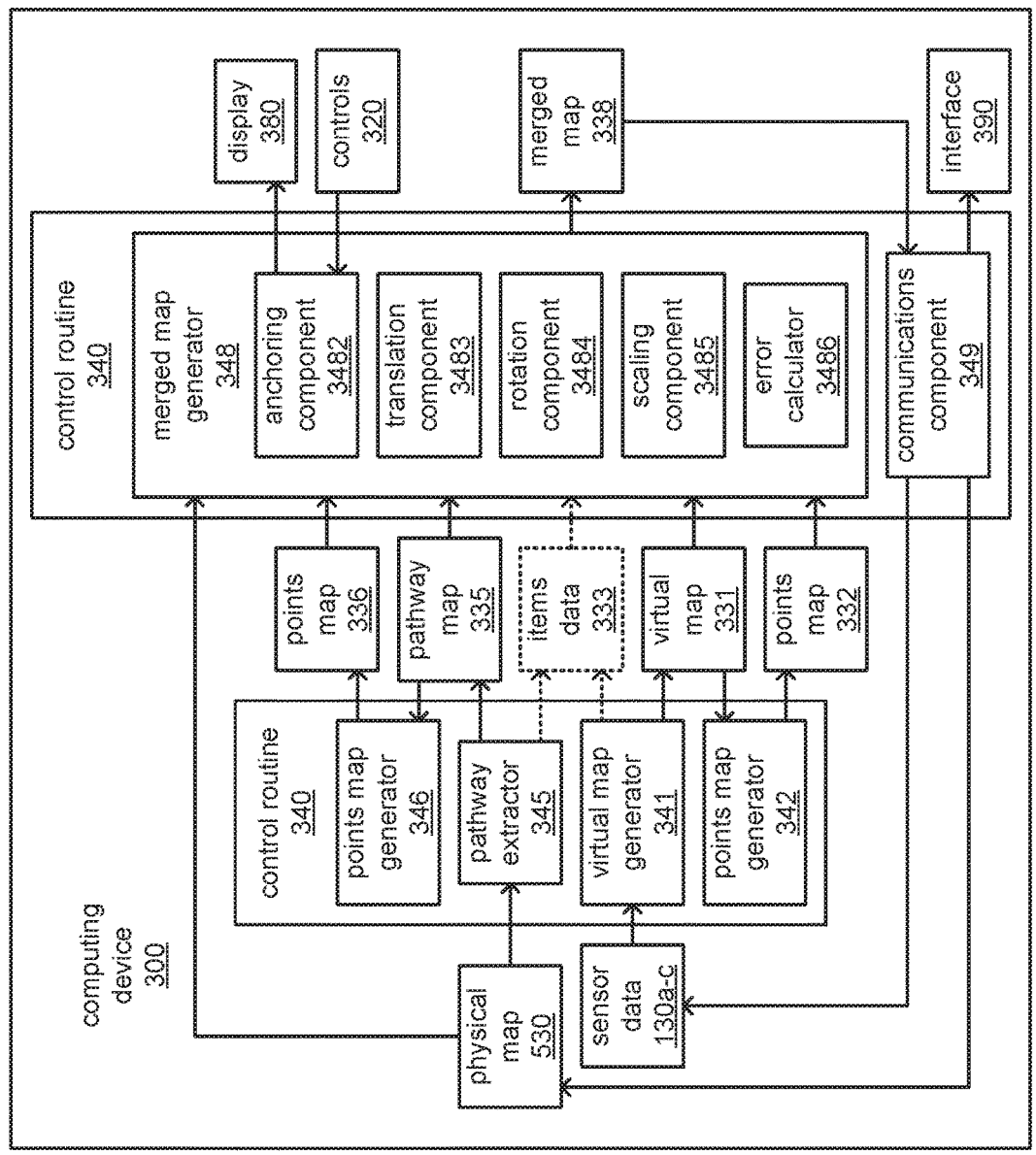
Figure 4:
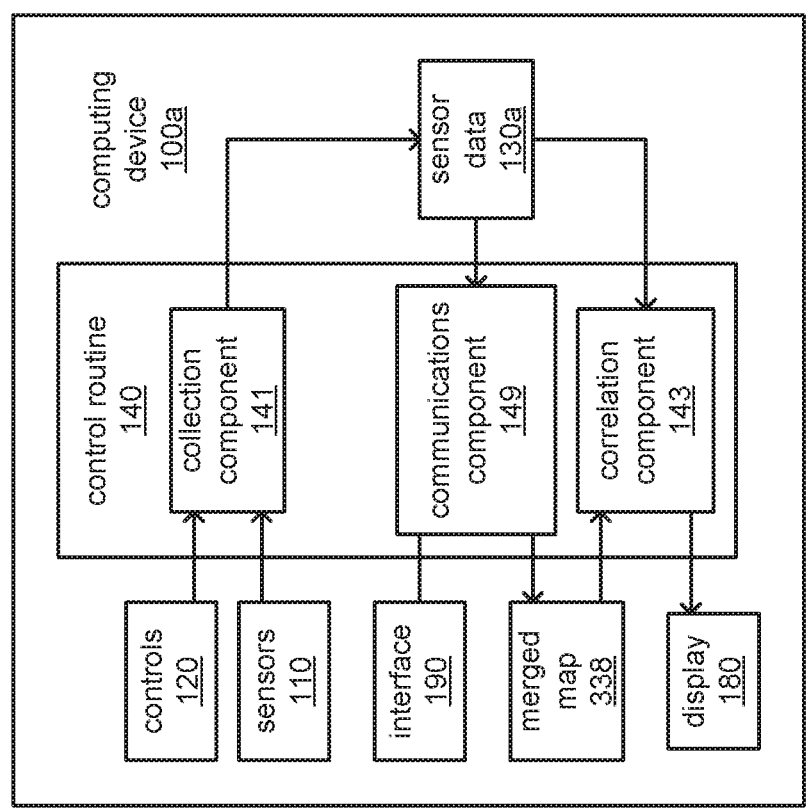

FIGS. 2, 3 and 4 are each a simplified block diagram of a portion of an embodiment of the map merging system 1000 of FIG. 1. Each of these figures depicts aspects of the operation of the merging of the virtual map 331 and the physical map 530 at different phases. More specifically, FIG. 2 depicts aspects of the collecting of the sensor data 130a by the computing device 100a in preparation for deriving the virtual map 331. FIG. 3 depicts aspects of generation of the virtual map 331 from the sensor data 130a-c, the generation of the pathway map 335 from the physical map 530, and the merging of maps to generate the merged map 338 by the computing device 300. FIG. 4 depicts aspects of the visual presentation of at least a portion of the merged map 338 and of a current location thereon by the computing device 100a.

In various embodiments, each of the control routines 140 and 340 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150 or 350. Where one or more device drivers are included, those device drivers may provide support for any of a variety of other components, whether hardware or software components, of corresponding ones of the computer systems 100 or 300.

Each of the control routines 140 and 340 may include or be otherwise linked to communications components 149 and 349 executable by the processor components 150 and 350 to operate the interfaces 190 and 390, respectively, to transmit and receive signals via the network 999 as has been described. Among the signals received may be signals conveying the sensor data 100a-c, the physical map 530 and/or the merged map 338 among one or more of the computing devices 100a-c and/or 300 via the network 999. As familiar to those skilled in the art, each of these communications components is selected to be operable with whatever type of interface technology is selected to implement corresponding ones of the interfaces 190 and 390.

Turning more specifically to FIG. 2, a collection component 141 of the control routine 140 receives signals conveying at least sensory information from one or more of sensors 110, storing it as the sensor data 130a, and transmitting it to the computing device 300. As depicted, the sensors 110 may include one or more of a wide variety of types of sensors, including and not limited to one or more of a compass 111, an accelerometer 112, a gyroscope 113, and a microphone 115 possibly paired with a speaker 114. Further, where the interface 190 incorporates the ability to communicate wirelessly, the interface 190 may be employed as a sensor in addition to being employed in wireless communications. Signals may also be received from the controls 120 indicating manual input of further information about a current location of the computing device 100a by its user.

The collection component 141 at least partially derives a virtual pathway along which the computing device 100a is moved through an interior of a structure from the sensory information received from the sensors 110, and stores an indication of that virtual pathway as the sensor data 130a. The exact nature of what is indicated in the sensor data 130a is at least partially dependent on what types of sensors are included as part of the sensors 110 in various possible embodiments. By way of example, where one or more of the compass 111, the accelerometer 112 and the gyroscope 113 are included in the sensors 110, the sensor data 130a is likely to indicate a virtual pathway referenced to compass headings and/or otherwise providing relatively precise determinations of degrees of angles turned at points where the direction of the virtual pathway changes. By way of another example, where the interface 190 is employed as a sensor and is able to detect the direction and/or relative strength of a signal from a wireless access point and/or other wireless device in the interior, the sensor data 130a is likely to indicate the virtual pathway as relative distances and/or directions along its length from that detected signal. By way of still another example, where the microphone 115 and the speaker 114 are employed together to perform echo location, the sensor data 130a is likely to indicate the virtual pathway as relative distances from one or more walls of the interior, essentially indicating portions of the virtual pathway that extend relatively parallel to a wall and/or that extend away from a wall. Further, the collection component 141 may also accept manually provided input of a user from manual operation of the controls 120 (e.g., a keyboard, a touchscreen, a rollerball pointing device, a stylus, etc.) by which the user may indicate an observed distance and/or direction from a structural feature of the interior (e.g., a wall, a corner, a post, etc.).

As familiar to those skilled in the art, the degree of accuracy of what is indicated in the sensor data 130a necessarily depends on the accuracy of whatever sensors are part of the sensors 110, and how much variety in the types of sensors are part of the sensors 110. Stated differently, the greater the variety of types of sensors from which sensory information may be collected as the computing device 100a is moved about an interior, the more complete the resulting perception of the interior may be, and the more accurate the derivation of a virtual pathway from that information may be. It is envisioned that typical computing devices that are moved about by their users in typical situations may have sensors of somewhat limited accuracy and variety. This arises from a presumption that most consumer varieties of computing devices may be designed to provide indications of a compass heading, closeness of a wireless access point, etc. as a convenience feature for users who may be unlikely to require a high degree of accuracy in such convenience features. Thus, metallic components of a structure may distort magnetic and/or radio field detection, acoustic treatments to quiet an interior may distort the use of echo location to detect a nearby wall, etc., and whatever types of sensors are included in the sensors 110 are envisioned as being unlikely to be designed to compensate for such difficulties.

Turning more specifically to FIG. 3, a virtual map generator 341 of the control routine 340 combines the virtual pathways indicated in each of the sensor data 130a-c into the single virtual map 331. As has been discussed, it is envisioned as likely that the indications of virtual pathways provided in any one of the sensor data 130a-c may be accurate to only a limited degree as it is envisioned that the sensors employed are likely to be of limited accuracy. Thus, it is envisioned that the virtual map generator 341 is to accept sensor data from a number of computing devices (again, a quantity of three computing devices 100a-c are depicted herein as a simplified example for purposes of illustration). Stated differently, it is envisioned that so-called "crowd-sourcing" is employed to provide numerous samples of sensor data as an input to the virtual map generator 341 to enable the generation of progressively more accurate incarnations of the virtual map 331 over time. A points map generator 342 of the control routine 340 parses the virtual pathways indicated in the virtual map 331 to derive the points at which there are turns and/or intersections at which segments of those virtual pathways meet. The points map generator 342 then stores indications of the relative locations of those points as the points map 332.

Figure 5:
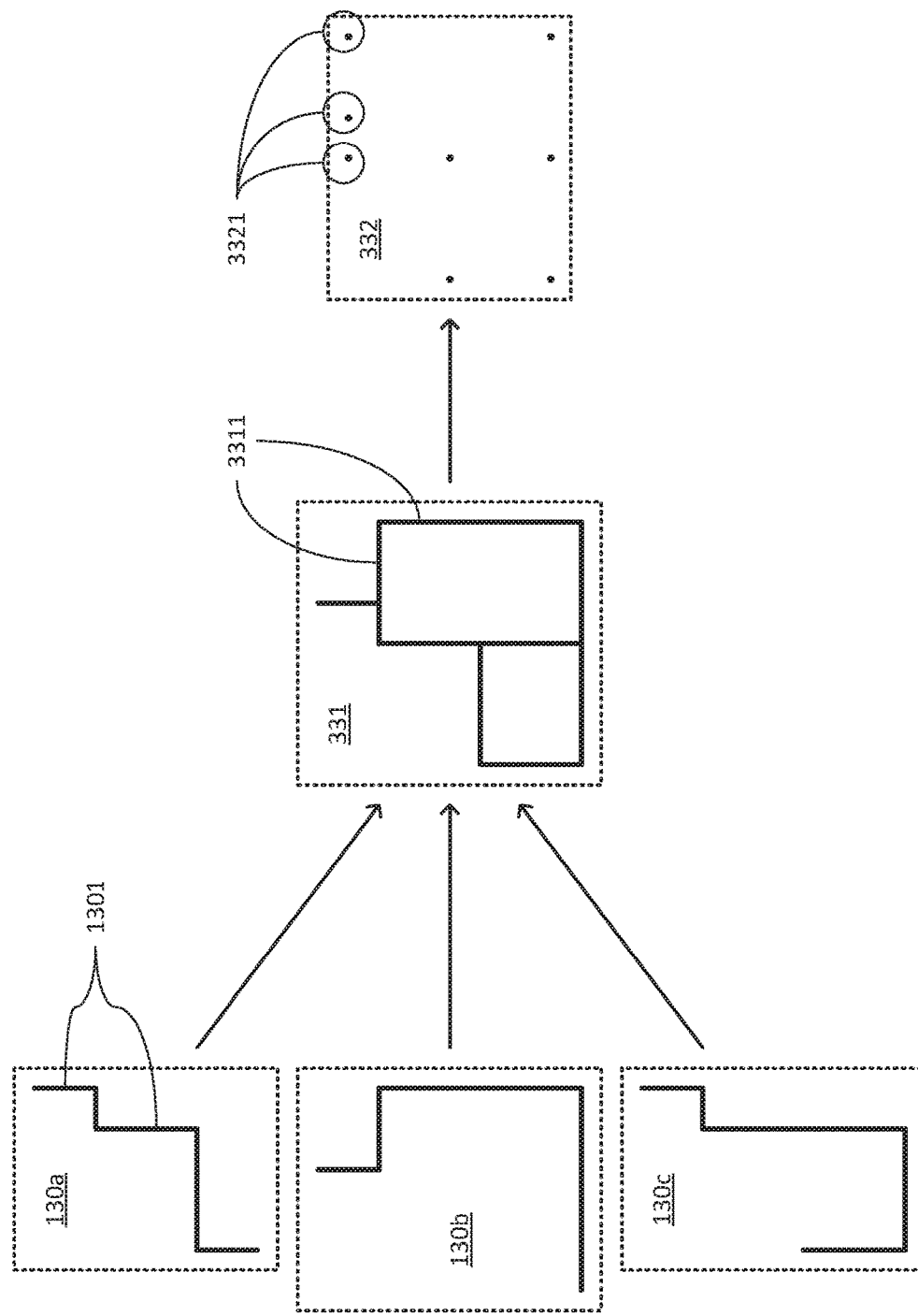
FIG. 5 illustrates generation of a virtual map and corresponding points map according to an embodiment.

FIG. 5 depicts an example of the generation of the virtual map 331 and the points map 332 by the virtual map generator 341 and the points map generator 342, respectively. It should be noted that FIG. 5 depicts a somewhat simplified view of the indications of the segments 1301 of virtual pathways in each of the sensor data 130a-c. In particular, it is envisioned that the segments 1301 of those virtual pathways may be unlikely to be indicated as being quite as straight and meeting at such clearly defined rectilinear angles as depicted. This relatively simplistic depiction is provided herein to facilitate understanding. As depicted, the virtual pathways indicated in each of the sensor data 130a-c are combined to form the virtual map 331 by the virtual map generator 341. The points map 332 is then generated from the virtual map 331 by the points map generator 342. The points map 332 incorporates indications of relative locations of points 3321 at which the segments 3311 of the virtual pathways of the virtual map 331 meet at either intersections or where there is a turn in the virtual pathway.

Returning to FIG. 3, a pathway extractor 345 of the control routine 340 parses the physical map 530 to extract indications of physical pathways therefrom, and stores those indications as the pathway map 335. As has been discussed, it is envisioned as possible for the data of the physical map 530 to be organized in any of a wide variety of types of data structure as there is currently no accepted standard for the manner in which such data is stored. Therefore, the pathway extractor 345 may incorporate the capability to identify the particular data structure of the physical map 530 from a variety of possible data structures as part of extracting indications of physical pathways therefrom. In extracting such indications, the pathway extractor 345 is effectively separating indications of physical pathways from other information expected to be included in the physical map 530, including and not limited to, indications of room numbers and/or locations of such items as fire extinguishers, public telephones, water fountains, elevators, etc.

In such extraction, outlines defining the boundaries of physical pathways are identified that may initially indicate locations of obstacles such as structural posts, slight bends, tables, cabinets, instances of some degree of narrowing by a doorway, etc. As part of more clearly identifying physical pathways, the pathway extractor 345 simplifies these outlines by filling in holes of physical pathways and/or smoothing boundaries. Then, the pathway extractor 345 generates indications of the physical pathways as segments that connect where there are intersections and/or turns in physical pathways. In so doing, the pathway extractor 345 may locate those segments generally in the middle of the outlined physical pathways based on a tendency of many persons to walk along the center of hallways, aisles formed among cubes and/or furnishings, etc. Then, a points map generator 346 of the control routine 340 parses the physical pathways indicated in the pathway map 335 with segments to generate the points map 336 indicating the points in the physical pathways of the pathway map 335 at which there are turns and/or intersections at which the segments of those pathways meet.

Figure 6:
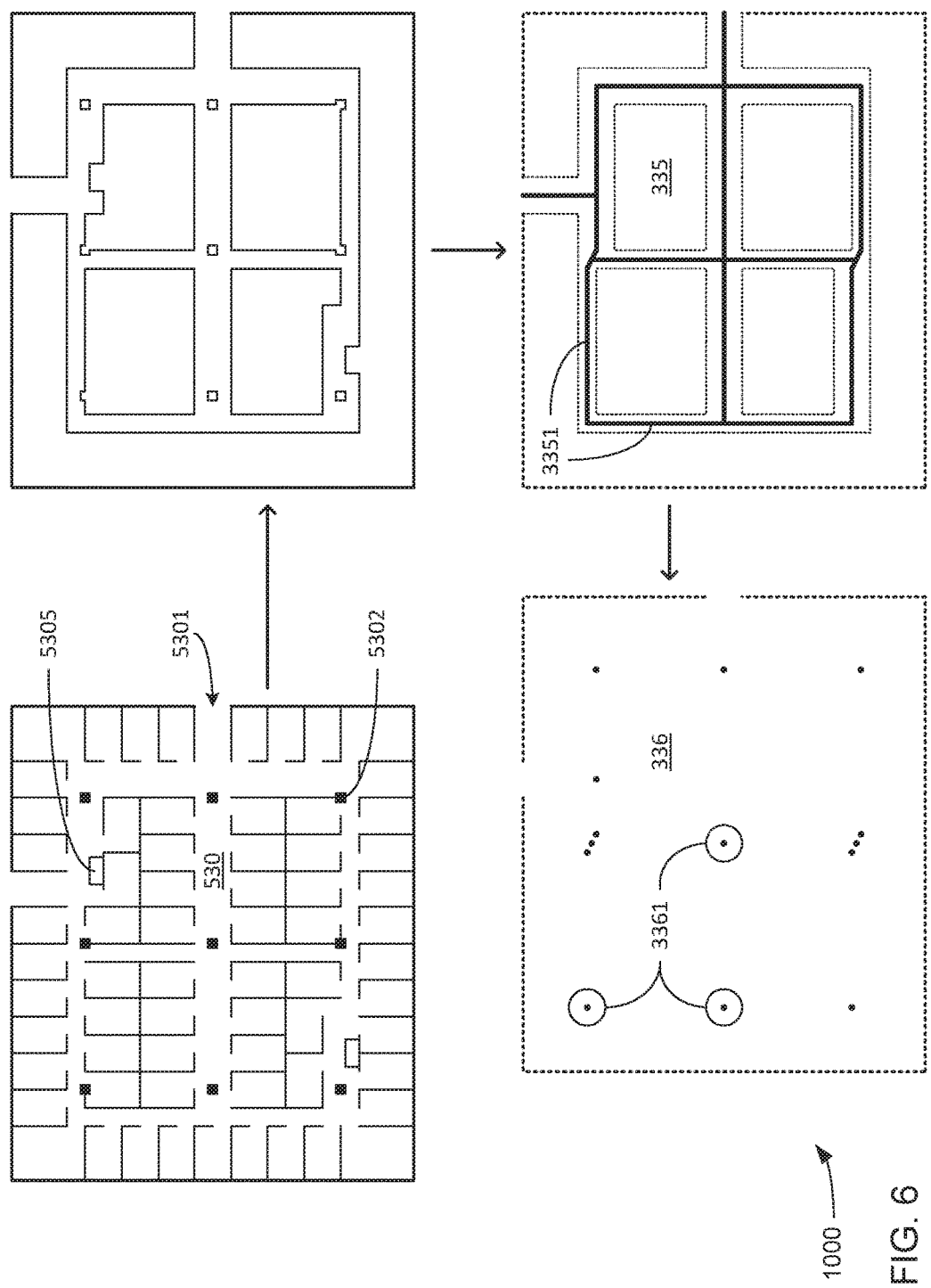
FIG. 6 illustrates generation of a pathway map and corresponding points map according to an embodiment.

FIG. 6 depicts an example of the generation of the pathway map 335 and the points map 336 by the pathway extractor 345 and the points map generator 346, respectively. As depicted, the physical map 530 conveys a great deal of information beyond simply indications of pathways concerning at least a portion of a floor of a structure. Specifically as depicted in this example, locations of entrances into cubes and/or rooms, floor entrances 5301, structural posts 5302, and other obstacles 5305 (e.g., a table with a copy machine, an office supply cabinet, a water fountain, a table, a bookcase, water feature, etc). The pathway extractor 345 first derives the outlines of physical pathways, effectively simplifying the physical map 530 to distinguish physical pathways from all other items indicated in the physical map 530. The pathway extractor 345 then simplifies the outlines of those physical pathways, filling in "holes" in those physical pathways caused by such items as the posts 5302, and smoothing the outlines by removing items such as the obstacles 5305. The pathway extractor 345 then redefines the physical pathways with segments 3351, thus further simplifying the indications of those physical pathways. Again, the pathway extractor 345 may employ an assumption that persons typically move along physical pathways in the center of those physical pathways, rather than by "hugging" walls as they move. Thus, the pathway map 335 is caused to indicate the physical pathways of the physical map 530 as the segments 3351 extending generally along the centers of those physical pathways. Following generation of the pathway map 335, the points map generator 346 generates the points map 336 therefrom. The points map 336 incorporates indications of locations of points 3361 at which the segments 3351 of the pathway map 335 meet either at intersections or where there is a turn in a physical pathway.

Figure 7:
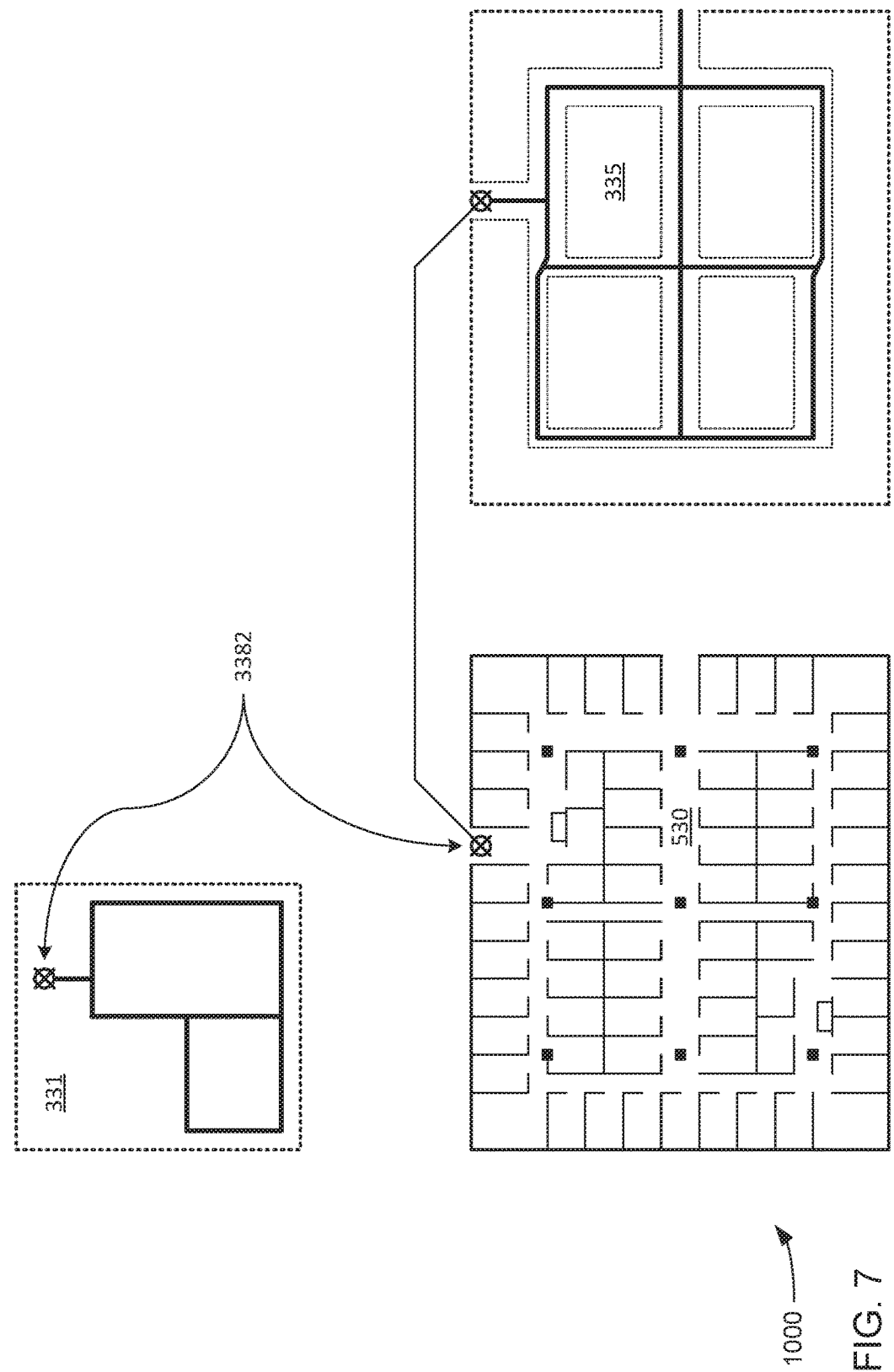
FIG. 7 illustrates specification of an anchor point according to an embodiment.

Returning again to FIG. 3, a merged map generator 348 of the control routine 340 generates the merged map 338 from some or all of the virtual map 331, the points map 332, the pathway map 335, the points map 336 and the physical map 530. In some embodiments, an anchoring component 3482 of the merged map generator 348 visually presents the virtual map 331 and the physical map 530 on the display 380 along with a request to an operator of the computing device 300 to specify an anchor point at which a particular location of the virtual map 331 coincides with the physical map 530 through manual operation of the controls 320. Such an anchor point may be specified to coincide with an entrance of a floor depicted in the physical map 530 (e.g., one of the entrances 5301 of the example of FIG. 6) or other feature that the operator of the computing device 300 is able to recognize. An example of specifying such an anchor point is depicted in FIG. 7. As just described, the virtual map 331 and the physical map 530 are visually presented to an operator, and the operator is requested to indicate a common anchor point 3382 on each of the virtual map 331 and the physical map 530 via the controls 320. With the anchor point 3382 so specified, the location of the anchor point 3382 on the physical map 530 is correlated to a location on the pathway map 335. The translation component 3483 then shifts (translates) the location of the virtual map 331 relative to the pathway map 335 to cause the locations of the anchor points 3382 of each to coincide such that the anchor points 3382 become a common anchor point.

Returning again to FIG. 3, presuming that such an anchor point (e.g., the anchor point 3382) is specified, each of a translation component 3483, a rotation component 3484 and a scaling component 3485 attempts to manipulate the virtual map 331 in various ways to align the virtual map 331 with the pathway map 335. It is envisioned as likely that the virtual map 331 may need some degree of manipulation to at least adjust its scale to match that of the pathway map 335, as it is deemed unlikely either may have been generated to match the scale of the other. It should be noted that in adjusting the scale of the virtual map 331, the relative proportions of the segments of the virtual pathways of the virtual map 331 are maintained. It is also envisioned as unlikely that the virtual map 331, unless generated with sensor data that may include compass headings of pathways, may be oriented in the same rotational direction as the pathway map 335. Stated differently, while the physical map 530 may indicate a compass heading in which it is oriented (e.g., an indication of which way is magnetic North), it is quite possible that none of the sensor data 130a-c may indicate a compass heading of any of their pathways such that the virtual map 331 may not include an indication of a compass heading for any of its virtual pathways. It is further envisioned as likely that, despite the provision of an indication of an anchor point at which the physical map 530 and the virtual map 331 are supposed to coincide, the operator of the computing device 300 may be somewhat inaccurate in indicating that anchor point such that some amount translation (i.e., shifting) of the virtual map 331 relative to the pathway map 335 is necessary as part of aligning them.

In various possible embodiments, different ones of these manipulations of the virtual map 331 relative to the pathway map 335 may be performed in differing order. By way of example in one embodiment, the translation component 3483 may first effect a translation of the virtual map 331 relative to the pathway map 335 to cause the anchor points of each to coincide. Then, the rotation component 3484 may try rotating the virtual map 331 to different orientations relative to the pathway map 335 and about their common anchor point until some degree of alignment (e.g., parallelism) is achieved between at least a subset of the segments of the virtual map 331 (e.g., at least a subset of the segments 3311) and at least a subset of the segments of the pathway map 335 (e.g., at least a subset of the segments 3351). Then, the scaling component may try scaling the virtual map 331 larger and/or smaller by various degrees relative to the pathway map 335, while maintaining their common anchor point, until achieving a relatively high degree of alignment (e.g., overlap) of segments of the virtual map 331 with segments of the pathway map 335. Further, the translation component 3483 may try effecting further translation of the virtual map 331 relative to the pathway map 335 following rotation and/or scaling of the virtual map 331. Such further translation may be tried to deliberately cause the anchor points of the virtual map 331 and the pathway map 335 to cease to coincide by some small degree to further improve alignment based on a premise that the operator may have specified the anchor point with only limited precision such that a correct alignment may require that the anchor points of the virtual map 331 and the pathway map 335 not coincide.

In performing the various translations, rotation and scaling manipulations of the virtual map 331, one or more of the translation component 3483, the rotation component 3484 and the scaling component 3485 may perform them in at least two stages, including a coarser stage and a finer stage. In a coarser stage, the various manipulations of the virtual map 331 are first tried with relatively larger increments of a measure between attempted manipulations. Then, in a finer stage, one or more of the same manipulations of the virtual map 331 are again tried with relatively smaller increments of the measure.

By way of example, the rotation component 3484 may first try rotating the virtual map 331 about the anchor point in increments of five degrees, checking the degree of alignment after each increment to determine which of those rotated orientations of the virtual map 331 brings about the closest alignment. Then, the rotation component 3484 may vary the orientation by a few degrees in each direction of rotation from the orientation just found to bring about the closest alignment in increments of one degree, checking the degree of alignment after each increment to determine which of those rotated orientations of the virtual map 331 brings about a still better alignment. This enables an orientation resulting in best alignment to be identified more quickly than in the typical "naive" approach of rotating the virtual map 331 about the anchor point in increments of one degree from the beginning. By employing two stages, fewer rotational orientations need be tried resulting in a best alignment being found more quickly with lesser demand placed on the processing resources of the processor component 350.

By way of another example, the scaling component 3485 may first try scaling the virtual map to sizes larger and/or smaller than its original size by increments of five percent of its original size, checking the degree of alignment after each increment to determine which of those rescaled sizes of the virtual map 331 brings about the closest alignment. Then the scaling component 3485 may vary the scale of the virtual map 331 by a small percentage both larger and smaller from the rescaled size that brought about the closest alignment in increments of one percent, checking the degree of alignment after each increment to determine which of those rescaled sizes of the virtual map 331 brings about a still better alignment.

Figure 8:
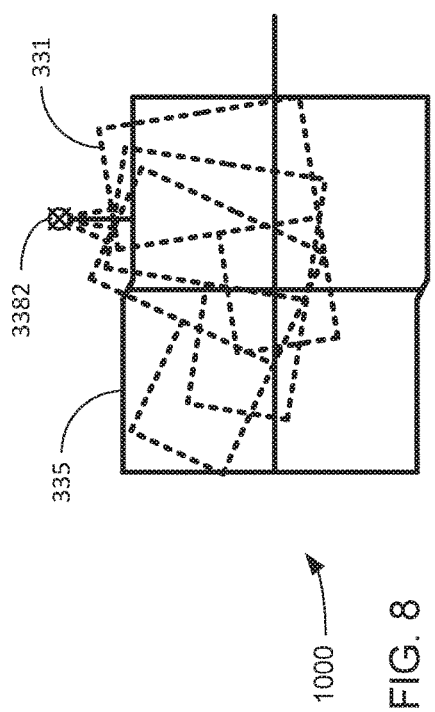
FIGS. 8-9 each illustrate manipulation of a virtual map according to an embodiment.
Figure 9:
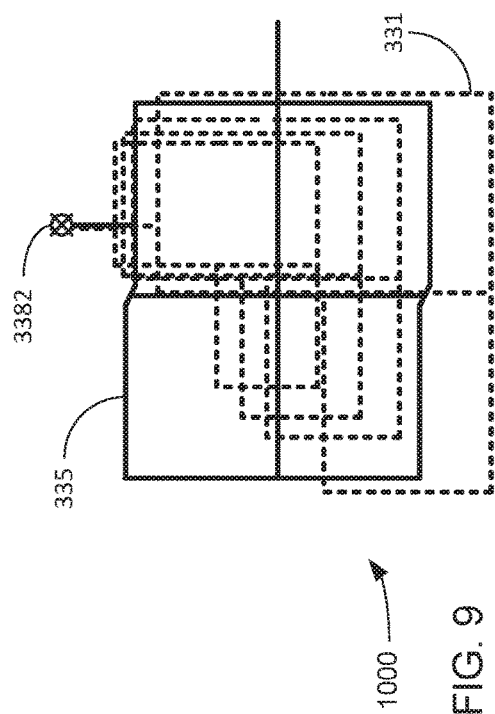

FIG. 8 depicts an example of different rotational orientations of the virtual map 331 being tried by the rotation component 3484, and FIG. 9 depicts an example of different rescaled sizes of the virtual map 331 being tried. In FIG. 8, different rotational orientations of the virtual map 331 (depicted with dotted lines) are attempted, with each orientation that is tried being rotated incrementally by a selected number of degrees from a previously tried orientation. In FIG. 9, the virtual map 331 is rescaled repeatedly to try different rescaled sizes (depicted with dotted lines), with each rescaled size that is tried being larger or smaller by a selected incremental percentage from a previously tried rescaled size. In the examples in both FIGS. 8 and 9, it can be seen that the common anchor point 3382 is maintained as the virtual map 331 is manipulated.

As each translation, orientation and/or scaling manipulation is tried, whether in coarse or fine increments, an error calculator 3486 of the control routine 340 determines the degree of alignment that results. In some embodiments, this degree of alignment may be determined as a degree of error derived by measuring a sum of the differences of locations of features of the virtual map 331 from features of the pathway map 335. More specifically, following each manipulation of the virtual map 331 relative to the pathway map 335, the difference in position from each point 3321 of the points map 332 (which corresponds to the virtual map 331) from the closest one of the points 3361 of the points map 336 (which corresponds to the pathway map 335) is measured and the sum of all of those differences is calculated to arrive at a total "error" value.

An example of one possible embodiment of such a calculation is:

$$E = \Sigma E_i = \Sigma \sqrt{(x_i - p_{xi})^2 + (y_i - p_{yi})^2}$$

in which E is the sum of all errors $E_i$, where $E_i$ is the error signifying the degree of difference in location (in two dimensions x and y) between the location $(x_i, y_i)$ of the ith point 3321 of the points map 332 and the location $(p_{xi}, p_{yi})$ of the closest one of the points 3361 of the points map 336 to that ith point of the points map 332. It is envisioned as likely that the number of segments 3311 of the virtual map 331 may be less than the number of segments 3351 of the pathway map 335, and thus, the number of points 3321 of the points map 332 may be less than the number of points 3361 of the points map 336. Thus, this calculation is performed for the total number of points 3321 on the points map 332 such that the index i iterates from "1" to that total number of the points 3321. Using this example calculation or others that quantify an error term derived from a measure of difference of features, a best rotational orientation, best scaled size and/or best translated position among multiple ones that are tried is the one that brings about the least error (e.g., the smallest difference in locations of points between the virtual map 331 and the pathway map 335).

Once the virtual map 331 has been manipulated sufficiently that it is aligned with the pathway map 335, the aligned position of the virtual map 331 relative to the pathway map 335 is correlated by the control routine 340 to the physical map 350 to enable the merging of the virtual map 331 and the physical map 350 to generate the merged map 338. The control routine 340 then provides the merged map 338 to other computing devices (e.g., the computing devices 100a-c).

Turning more specifically to FIG. 4, a correlation component 143 of the control routine 140 employs the merged map 338 and a current incarnation of the sensor data 130a providing indications of a current location of the computing device 100a to visually present the current location of the computing device 100a on at least a portion of the merged map 338 on the display 180. To do this, the correlation component compares indications of the current position in the current incarnation of the sensor data 130a to the indications of virtual pathways that have been merged into the merged map 338 to identify the current location on a physical pathway that has also been merged into the merged map 338. With the merged map 338 correlating locations along those virtual pathways to locations along the physical pathways, the merged map 338 enables a visual presentation of the current location of the computing device 100a along a physical pathway that can be visually recognized by an operator of the computing device 100a as resembling the current location.

Figure 10:
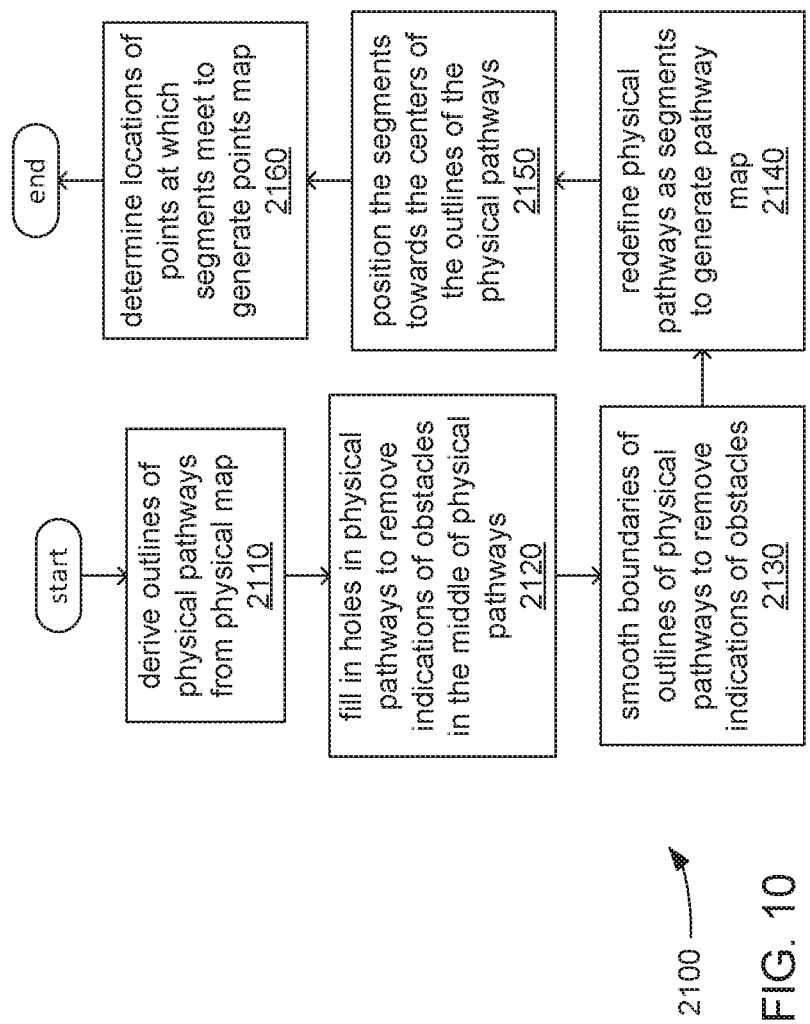
FIGS. 10-11 each illustrate a logic flow according to an embodiment.

FIG. 10 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the computing device 300.

At 2110, a processor component of a computing device of a map merging system (e.g., the processor component 350 of the computing device 300 of the map merging system 1000) is caused by execution of pathway extractor of a control routine (e.g., the control routine 340) to derive outlines of physical pathways from a physical map of at least a portion of a floor of an interior of a structure (e.g., the physical map 530). As has been discussed, it is envisioned that typical physical maps are likely to include other information beyond depictions of physical paths, including items of interest such as locations of fire extinguishers, structural posts, etc.

At 2120, holes in the outlined physical pathways are filled to remove indications of obstacles positioned amidst portions of physical pathways (e.g., the structural posts 5302). At 2130, boundaries of the outlined physical pathways are smoothed to remove indications of obstacles that intruded into physical pathways from the boundaries (e.g., the obstacles 5305). The removal of indications of obstacles simplifies the indications of location and direction of the pathways.

At 2140, the physical pathways are redefined as segments, thereby generating a pathway map that is made up of indications of the placement of those segments. At 2150, those segments may be positioned towards the centers of the outlined physical pathways in acknowledgement of a tendency of persons to move generally along the center of hallways, aisles, etc. At 2160, the processor component is caused by execution of a points map generator of the control routine to determine locations of points at which one or more of the segments of the pathway map meet, and generate a points map of the locations of those points.

Figure 11:
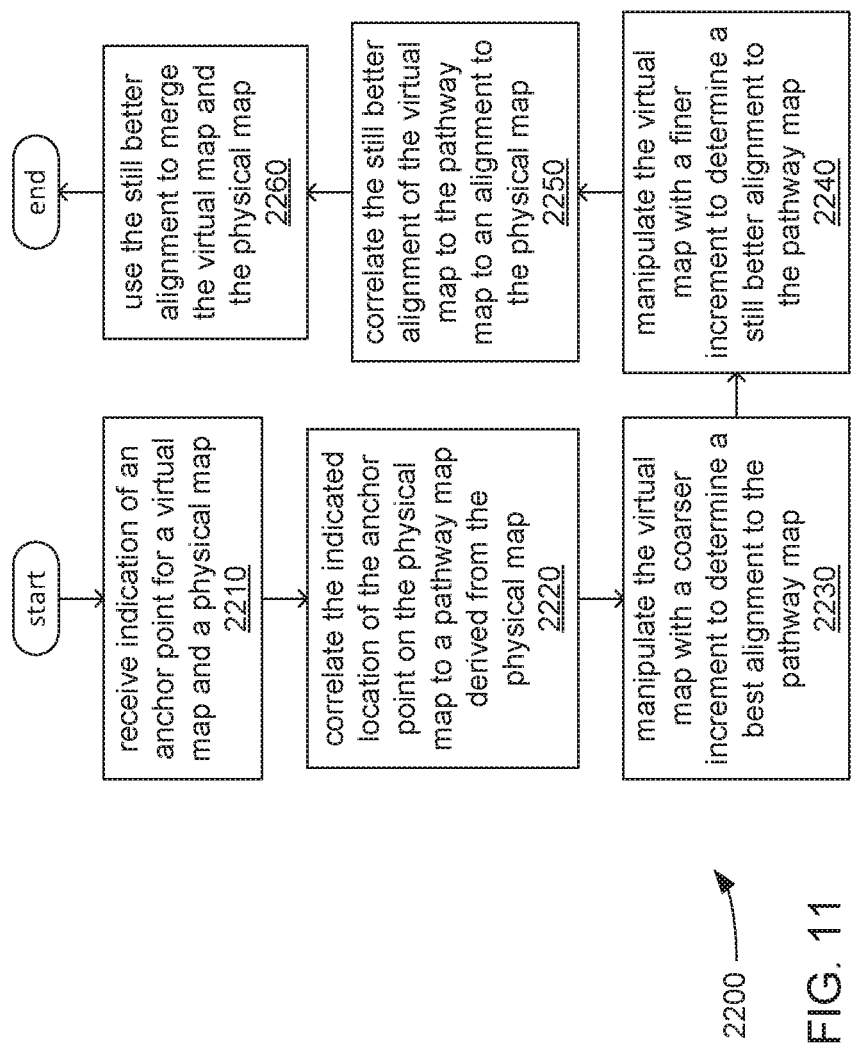

FIG. 11 illustrates one embodiment of a logic flow 2200. The logic flow 2200 may be representative of some or all of the operations executed by one or more embodiments described herein. More specifically, the logic flow 2200 may illustrate operations performed by the processor component 350 in executing at least the control routine 340, and/or performed by other component(s) of the computing device 300.

At 2210, a processor component of a computing device of a map merging system (e.g., the processor component 350 of the computing device 300 of the map merging system 1000) receives an indication of corresponding anchor points for a virtual map and a physical map (e.g., the corresponding anchor points 3382 of the virtual map 331 and the physical map 530). As has been explained, an operator of the computing device may be visually presented with the physical map and the virtual map, as well as a request to indicate an anchor point for each at which a location on the two maps would correspond.

At 2220, the indication of a location of an anchor point received for the physical map is correlated to a pathway map derived by extracting indications of physical pathways from the physical map. As has been explained, the correlation of the anchor point of the physical map to its corresponding pathway map enables further processing to align the virtual pathways of the virtual map to the physical pathways of the pathway map.

At 2230, the virtual map is repeatedly manipulated in one or more of translation, rotation and scaling in a selected coarser increment between manipulations to determine a best alignment of the virtual pathways of the virtual map with the physical pathways of the pathway map. As has been explained, initial coarser increments of degree of rotation, percentage of size in rescaling and/or distance in translation are used in a coarser stage to find a best alignment.

At 2240, the virtual map is further repeatedly manipulated in one or more of translation, rotation and scaling in a selected finer increment between manipulations, and starting with the just determined best alignment to determine a still better alignment of the virtual pathways with the physical pathways of the pathway map. As has been explained, trying various rotated orientations, rescaled sized and/or translations of the virtual map relative to the pathway map in first a coarser stage followed by a finer stage enables a best alignment to be determined in less time with fewer demands on the processor component.

At 2250, the alignment of the virtual map to the pathway map that was determined through the manipulations with coarser and finer increments to be a still better alignment is correlated to the physical map to align the virtual map to the physical map. At 2260, the virtual and physical maps are merged using the still better alignment.

Figure 12:
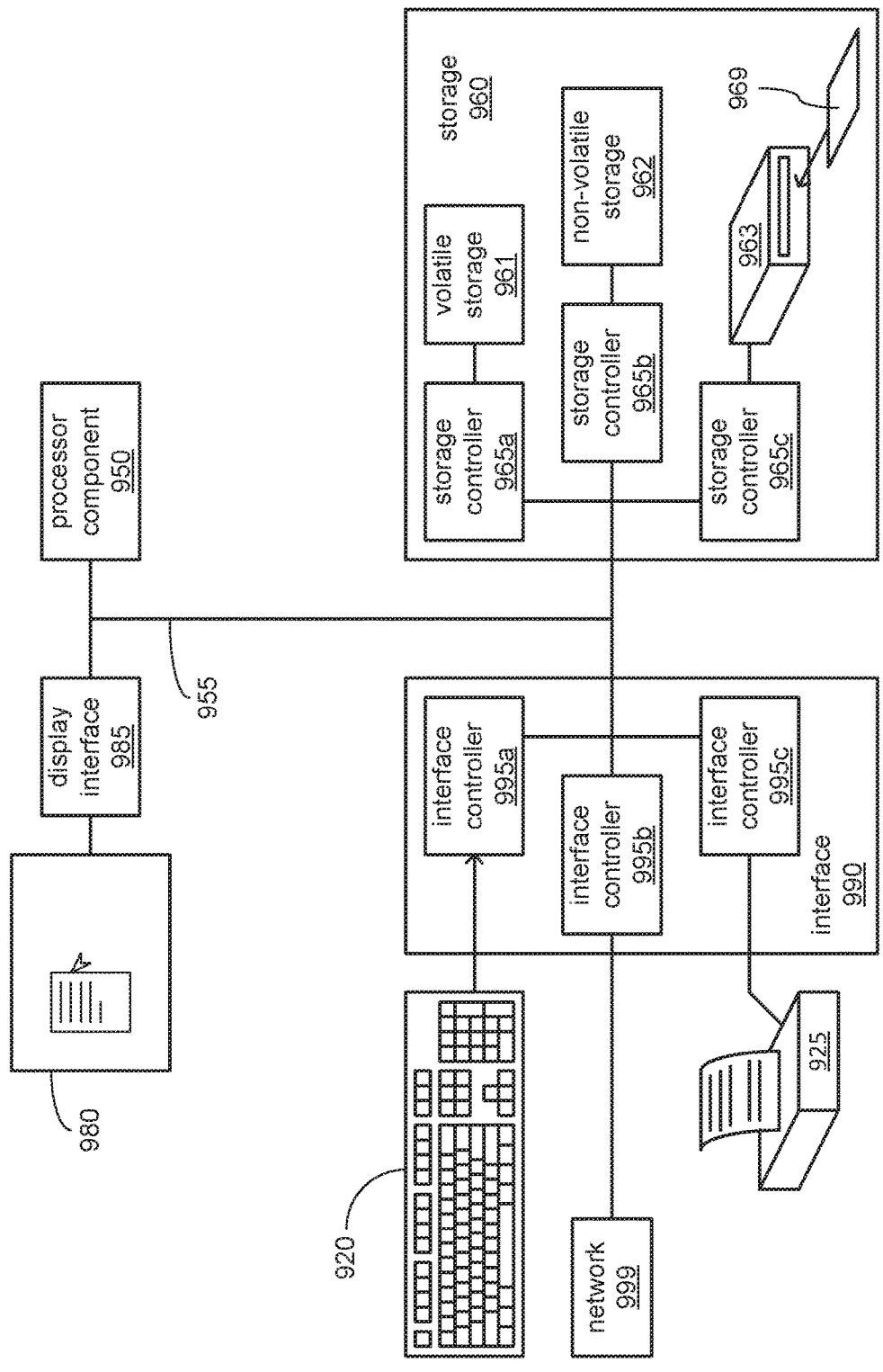
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of the computing device 300. It should be noted that components of the processing architecture 3000 are given reference numbers in which the last two digits correspond to the last two digits of reference numbers of at least some of the components earlier depicted and described as part of one or more of the computing devices 100a-c and 300. This is done as an aid to correlating components of each.

The processing architecture 3000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to one or more of the processor components 150 and 350) may include any of a wide variety of commercially available processors, employing any of a wide variety of technologies and implemented with one or more cores physically combined in any of a number of ways.

As previously discussed, the storage 960 (corresponding to one or more of the storages 160 and 360) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to one or more of the interfaces 190 and 390) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to one or more of the displays 180 and 380), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to merge maps includes a processor component; and a merged map generator for execution by the processor component to merge a virtual map and a physical map to generate a merged map, the virtual map comprising indications of virtual pathways through an interior of a structure based on sensors, and the physical map comprising indications of physical pathways of the interior.

The above example of an apparatus in which the apparatus includes an error calculator for execution by the processor component, the merged map generator to repeatedly manipulate the virtual map relative to a pathway map and the error calculator to determine a degree of error representing a sum of differences of locations between features of the virtual map and features of the pathway map for each manipulation of the virtual map, the pathway map indicating locations of the physical pathways.

Either of the above examples of an apparatus in which the apparatus includes a display communicatively coupled to the processor component; and an anchoring component for execution by the processor component to visually present a request for an indication of an anchor point at which the virtual map and the physical map coincide on the display, and to correlate a location of the anchor point on the physical map to a location on the pathway map.

Any of the above examples of an apparatus in which the apparatus includes a rotation component for execution by the processor component to rotate the virtual map relative to the pathway map about the anchor point to multiple orientations, the error calculator to determine a degree of error for each orientation of the multiple orientations to determine which orientation of the multiple orientations provides a best alignment between the virtual map and the pathway map.

Any of the above examples of an apparatus in which the apparatus includes a scaling component for execution by the processor component to scale the virtual map to multiple sizes relative to the pathway map while maintaining the anchor point, the error calculator to determine a degree of error for each size of the multiple sizes to determine which size of the multiple sizes provides a best alignment between the virtual map and the pathway map.

Any of the above examples of an apparatus in which the features of the virtual map include points at which two or more segments of a virtual pathway meet, and the features of the pathway map include points at which two or more segments of a physical pathway meet.

Any of the above examples of an apparatus in which the apparatus includes a pathway extractor for execution by the processor component to generate a pathway map comprising indications of locations of the physical pathways from the physical map.

Any of the above examples of an apparatus in which the merged map generator is to repeatedly manipulate the virtual map relative to the pathway map in a first stage in coarser increments to determine a best alignment of the virtual map with the pathway map and in a second stage in finer increments to determine a still better alignment of the virtual map with the pathway map.

Any of the above examples of an apparatus in which the apparatus includes a rotation component for execution by the processor component to rotate the virtual map relative to the pathway map in the first stage in increments of a first selected quantity of degrees of rotation and in the second stage in increments of a second selected quantity of degrees of rotation, the first selected quantity greater than the second.

Any of the above examples of an apparatus in which the apparatus includes a scaling component for execution by the processor component to scale the virtual map relative to the pathway map in the first stage in increments of a first selected percentage of size of the virtual map and in the second stage in increments of a second selected percentage of size of the virtual map, the first selected percentage greater than the second.

Any of the above examples of an apparatus in which the merged map generator is to correlate an alignment of the virtual map with the pathway map to an alignment of the virtual map with the physical map.

Any of the above examples of an apparatus in which the apparatus includes an interface communicatively coupled to the processor component to transmit the merged map to at least one of the computing devices.

An example of another apparatus to merge maps includes a processor component; and a merged map generator for execution by the processor component to align segments of virtual pathways of a virtual map with segments of physical pathways of a pathway map, the virtual pathways comprising pathways of an interior of a structure based on sensors, and the physical pathways comprising pathways enabling physical movement through the interior.

The above example of another apparatus in which the apparatus includes a pathway extractor for execution by the processor component to extract indications of the physical pathways from a physical map of at least a portion of the structure to generate the pathway map.

Either of the above examples of another apparatus in which the merged map generator is to correlate an alignment of the virtual pathways with the physical pathways to an alignment of the virtual map to the physical map, and to merge the virtual map and the physical map to generate a merged map.

Any of the above examples of another apparatus in which the merged map generator is to repeatedly manipulate the virtual map relative to the pathway map in a first stage in coarser increments to determine a best alignment of the virtual pathways with the physical pathways and in a second stage in finer increments to determine a still better alignment of the virtual pathways with the physical pathways.

Any of the above examples of another apparatus in which the apparatus includes a rotation component for execution by the processor component to rotate the virtual map relative to the pathway map in the first stage in increments of a first selected quantity of degrees of rotation and in the second stage in increments of a second selected quantity of degrees of rotation, the first selected quantity greater than the second.

Any of the above examples of another apparatus in which the apparatus includes a scaling component for execution by the processor component to scale the virtual map relative to the pathway map in the first stage in increments of a first selected percentage of size of the virtual map and in the second stage in increments of a second selected percentage of size of the virtual map, the first selected percentage greater than the second.

Any of the above examples of another apparatus in which the apparatus includes an error calculator for execution by the processor component to determine a degree of error representing a sum of differences of locations between features of the virtual map and features of the pathway map for each manipulation of the virtual map.

Any of the above examples of another apparatus in which the features of the virtual map include points at which two or more segments of a virtual pathway meet, and the features of the pathway map include points at which two or more segments of a physical pathway meet.

An example of a computer-implemented method for merging maps includes generating a virtual map comprising indications of virtual pathways through an interior of a structure based on sensors, and merging the virtual map and a physical map comprising indications of physical pathways of the interior to generate a merged map.

The above example of a computer-implemented method in which the method includes generating a pathway map from the indications of the physical pathways of the physical map, repeatedly manipulating the virtual map relative to the pathway map, and determining a degree of error representing a sum of differences of locations between features of the virtual map and features of the pathway map for each manipulation of the virtual map.

Either of the above examples of a computer-implemented method in which the method includes visually presenting the physical map, the virtual map and a request for an indication of an anchor point at which the virtual map and the physical map coincide on a display, and correlating a location of the anchor point on the physical map to a location on the pathway map.

Any of the above examples of a computer-implemented method in which the method includes rotating the virtual map relative to the pathway map about the anchor point to multiple orientations, and determining which orientation of the multiple orientations provides a best alignment between the virtual map and the pathway map.

Any of the above examples of a computer-implemented method in which the method includes scaling the virtual map to multiple sizes relative to the pathway map while maintaining the anchor point, and determining which size of the multiple sizes provides a best alignment between the virtual map and the pathway map.

Any of the above examples of a computer-implemented method in which the features of the virtual map include points at which two or more segments of a virtual pathway meet, and the features of the pathway map include points at which two or more segments of a physical pathway meet.

Any of the above examples of a computer-implemented method in which the method includes repeatedly manipulating the virtual map relative to the pathway map in a first stage in coarser increments to determine a best alignment of the virtual map with the pathway map, and repeatedly manipulating the virtual map relative to the pathway map in a second stage in finer increments to determine a still better alignment of the virtual map with the pathway map.

Any of the above examples of a computer-implemented method in which the method includes rotating the virtual map relative to the pathway map in the first stage in increments of a first selected quantity of degrees of rotation, and rotating the virtual map relative to the pathway map in the second stage in increments of a second selected quantity of degrees of rotation, the first selected quantity greater than the second.

Any of the above examples of a computer-implemented method in which the method includes scaling the virtual map relative to the pathway map in the first stage in increments of a first selected percentage of size of the virtual map, and scaling the virtual map relative to the pathway map in the second stage in increments of a second selected percentage of size of the virtual map, the first selected percentage greater than the second.

Any of the above examples of a computer-implemented method in which the method includes correlating an alignment of the virtual map with the pathway map to an alignment of the virtual map with the physical map, and transmitting the merged map to at least one of the computing devices.

An example of an apparatus for merging maps includes means for performing any of the embodiments described herein of a computer-implemented method.

An example of at least one machine readable storage medium includes instructions that when executed by a computing device, causes the computing device to perform any of the embodiments described herein of a computer-implemented method.

An example of at least one machine-readable storage medium includes instructions that when executed by a computing device, cause the computing device to generate a virtual map comprising indications of virtual pathways through an interior of a structure based on sensors, and merge the virtual map and a physical map comprising indications of physical pathways of the interior to generate a merged map.

The above example of at least one machine-readable storage medium in which the computing device is caused to generate a pathway map from the indications of the physical pathways of the physical map, repeatedly manipulate the virtual map relative to the pathway map, and determine a degree of error representing a sum of differences of locations between features of the virtual map and features of the pathway map for each manipulation of the virtual map.

Either of the above examples of at least one machine-readable storage medium in which the computing device is caused to visually present the physical map, the virtual map and a request for an indication of an anchor point at which the virtual map and the physical map coincide on a display of the computing device, and correlate a location of the anchor point on the physical map to a location on the pathway map.

Any of the above examples of at least one machine-readable storage medium in which the computing device is caused to rotate the virtual map relative to the pathway map about the anchor point to multiple orientations, and determine which orientation of the multiple orientations provides a best alignment between the virtual map and the pathway map.

Any of the above examples of at least one machine-readable storage medium in which the computing device is caused to scale the virtual map to multiple sizes relative to the pathway map while maintaining the anchor point, and determine which size of the multiple sizes provides a best alignment between the virtual map and the pathway map.

Any of the above examples of at least one machine-readable storage medium in which the features of the virtual map include points at which two or more segments of a virtual pathway meet, and the features of the pathway map include points at which two or more segments of a physical pathway meet.

Any of the above examples of at least one machine-readable storage medium in which the computing device is caused to repeatedly manipulate the virtual map relative to the pathway map in a first stage in coarser increments to determine a best alignment of the virtual map with the pathway map, and repeatedly manipulate the virtual map relative to the pathway map in a second stage in finer increments to determine a still better alignment of the virtual map with the pathway map.

The invention claimed is:

1. An apparatus, comprising:
   at least one sensor;
   a processor component coupled to the at least one sensor; and
   memory comprising instructions, which when executed by the processor component cause the processor component to:
   receive sensor data from the at least one sensor, the sensor data representing a movement of the apparatus within an interior of a structure along a plurality of segments;
   generate a virtual map from the plurality of segments, the virtual map representing the movement along a path comprising the plurality of segments;
   generate a physical pathway map from a physical map of at least a portion of the interior of the structure;
   align the virtual map with the physical pathway map; and
   merge the virtual map aligned with the physical pathway map to generate a merged map representing the movement of the apparatus overlaid with a map of the interior of the structure;
   the memory comprising instructions that when executed by the processor component cause the processor component further to:
   generate a virtual points map based at least in part on the virtual map and the plurality of segments of the path, the virtual points map comprising a first plurality of points, at least one of the first plurality of points representing a turn on the path;
   generate a physical pathway points map based at least in part on the physical pathway, the physical pathway points map comprising a second plurality of points, at least one of the second plurality of points representing an obstacle or bend in the interior of the structure; and
   align ones of the first plurality of points with ones of the second plurality of points to align the virtual map with the physical pathway map.

2. The apparatus of claim 1, the merged map to indicate locations of one or more items of interest.

3. The apparatus of claim 2, the merged map to indicate a location of at least one business.

4. The apparatus of claim 1, the sensor data to include at least one of accelerometer data or gyroscope data.

5. The apparatus of claim 1, the memory comprising instructions that when executed by the processor component cause the processor component to:

receive an indication of a one of the first plurality of points to anchor to a one of the second plurality of points;

overlap the one of the first plurality of points with the one of the second plurality of points; and align the first plurality of points with the second plurality of points while maintaining the overlap of the one of the first plurality of points with the one of the second plurality of points to align the virtual map with the physical pathway map.

6. The apparatus of claim 5, the memory comprising instructions that when executed by the processor component cause the processor component to rotate the virtual map about one of the first plurality of points to align the virtual map with the physical pathway map.

7. The apparatus of claim 6, the memory comprising instructions that when executed by the processor component cause the processor component to minimize a difference between locations of the first plurality of points with locations the second plurality of points to align the virtual map with the physical pathway map.

8. At least one non-transitory machine-readable storage medium comprising instructions that, when executed by a processor, cause the processor to:

receive sensor data, the sensor data representing a movement of a mobile device within an interior of a structure along a plurality of segments;

generate a virtual map from the plurality of segments, the virtual map representing the movement along a path comprising the plurality of segments;

generate a physical pathway map from a physical map of at least a portion of the interior of the structure;

align the virtual map with the physical pathway map;

merge the virtual map with the physical pathway map to generate a merged map representing the movement of the mobile device overlaid with a map of the interior of the structure;

the at least one non-transitory machine-readable storage medium comprising instructions that, when executed by the processor, cause the processor further to:

generate a virtual points map based at least in part on the virtual map and the plurality of segments of the path, the virtual points map comprising a first plurality of points, at least one of the first plurality of points representing a turn on the path;

generate a physical pathway points map based at least in part on the physical pathway, the physical pathway points map comprising a second plurality of points, at least one of the second plurality of points representing an obstacle or bend in the interior of the structure; and align ones of the first plurality of points with ones of the second plurality of points to align the virtual map with the physical pathway map.

9. The at least one non-transitory machine-readable storage medium of claim 8, the physical map comprising indications of one or more physical pathways, the one of more physical pathways to comprise pathways enabling movement through the interior of the structure.

10. The at least one non-transitory machine-readable storage medium of claim 8, the merged map to indicate locations of one or more items of interest.

11. The at least one non-transitory machine-readable storage medium of claim 10, the merged map to indicate a location of at least one business.

12. The at least one non-transitory machine-readable storage medium of claim 8, the sensor data to include at least one of accelerometer data or gyroscope data.

13. The at least one non-transitory machine-readable storage medium of claim 8, comprising instructions that, when executed by the processor, cause the processor to:

receive an indication of a one of the first plurality of points to anchor to a one of the second plurality of points;

overlap the one of the first plurality of points with the one of the second plurality of points; and align the first plurality of points with the second plurality of points while maintaining the overlap of the one of the first plurality of points with the one of the second plurality of points to align the virtual map with the physical pathway map.

14. The at least one non-transitory machine-readable storage medium of claim 13, comprising instructions that, when executed by the processor, cause the processor to rotate the virtual map about one of the first plurality of points to align the virtual map with the physical pathway map.

15. The at least one non-transitory machine-readable storage medium of claim 14, comprising instructions that, when executed by the processor, cause the processor to minimize a difference between locations of the first plurality of points with locations the second plurality of points to align the virtual map with the physical pathway map.

16. An apparatus, comprising:

a communication interface;

a processor component communicatively coupled to the communication interface; and memory comprising instructions, which when executed by the processor component cause the processor component to:

receive, via the communication interface, sensor data representing a movement of a mobile device within an interior of a structure along a plurality of segments;

generate a virtual map from the plurality of segments, the virtual map representing the movement along a path comprising the plurality of segments;

generate a physical pathway map from a physical map of at least a portion of the interior of the structure;

align the virtual map with the physical pathway map; and merge the virtual map aligned with the physical pathway map to generate a merged map representing the movement of the mobile device overlaid with a map of the interior of the structure;

the memory comprising instructions that when executed by the processor component cause the processor component further to:

generate a virtual points map based at least in part on the virtual map and the plurality of segments of the path, the virtual points map comprising a first plurality of points, at least one of the first plurality of points representing a turn on the path;

generate a physical pathway points map based at least in part on the physical pathway, the physical pathway points map comprising a second plurality of points, at least one of the second plurality of points representing an obstacle or bend in the interior of the structure; and align ones of the first plurality of points with ones of the second plurality of points to align the virtual map with the physical pathway map.

17. The apparatus of claim 16, the memory comprising instructions that when executed by the processor component cause the processor component to:

receive an indication of a one of the first plurality of points to anchor to a one of the second plurality of points;

overlap the one of the first plurality of points with the one of the second plurality of points; and align the first plurality of points with the second plurality of points while maintaining the overlap of the one of the first plurality of points with the one of the second plurality of points to align the virtual map with the physical pathway map.

18. The apparatus of claim 17, the memory comprising instructions that when executed by the processor component cause the processor component to rotate the virtual map about one of the first plurality of points to align the virtual map with the physical pathway map.

19. The apparatus of claim 18, the memory comprising instructions that when executed by the processor component cause the processor component to minimize a difference between locations of the first plurality of points with locations the second plurality of points to align the virtual map with the physical pathway map.

20. The apparatus of claim 19, the merged map to indicate locations of one or more items of interest or at least one business.

21. The apparatus of claim 19, the sensor data to include at least one of accelerometer data or gyroscope data.

22. The apparatus of claim 19, the memory comprising instructions that when executed by the processor component cause the processor component to send to the mobile device, via the communication interface, the merged map.

* * * * *